UNITED STATES PATENT OFFICE.

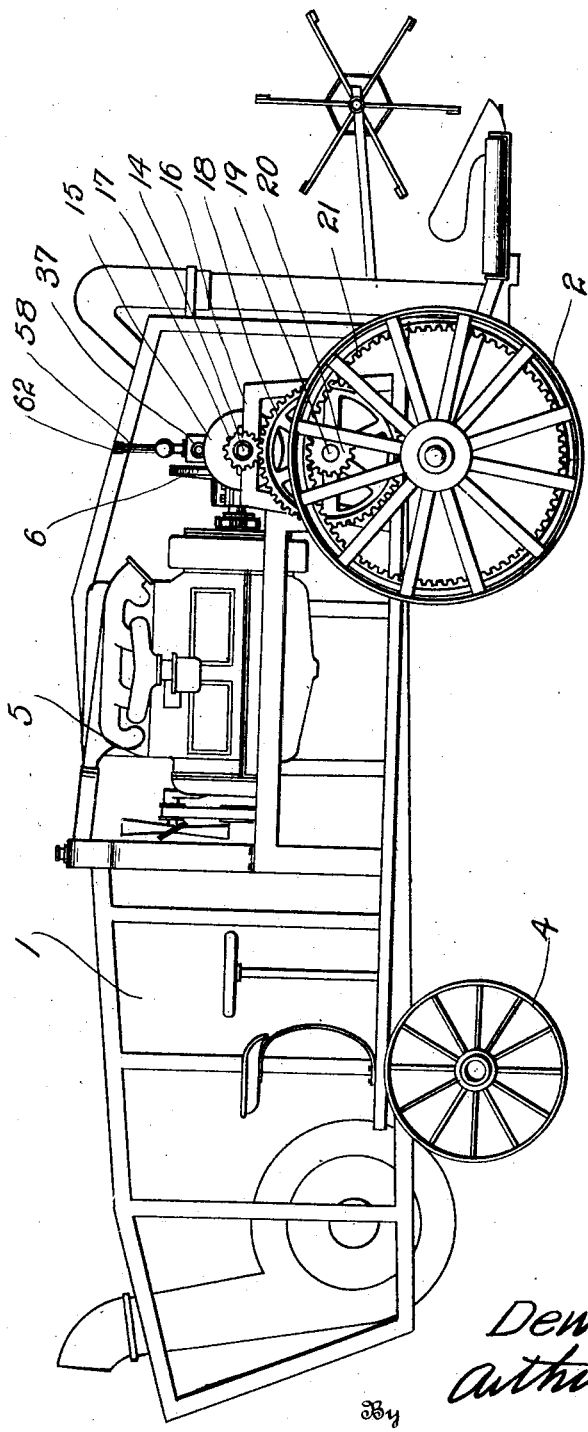

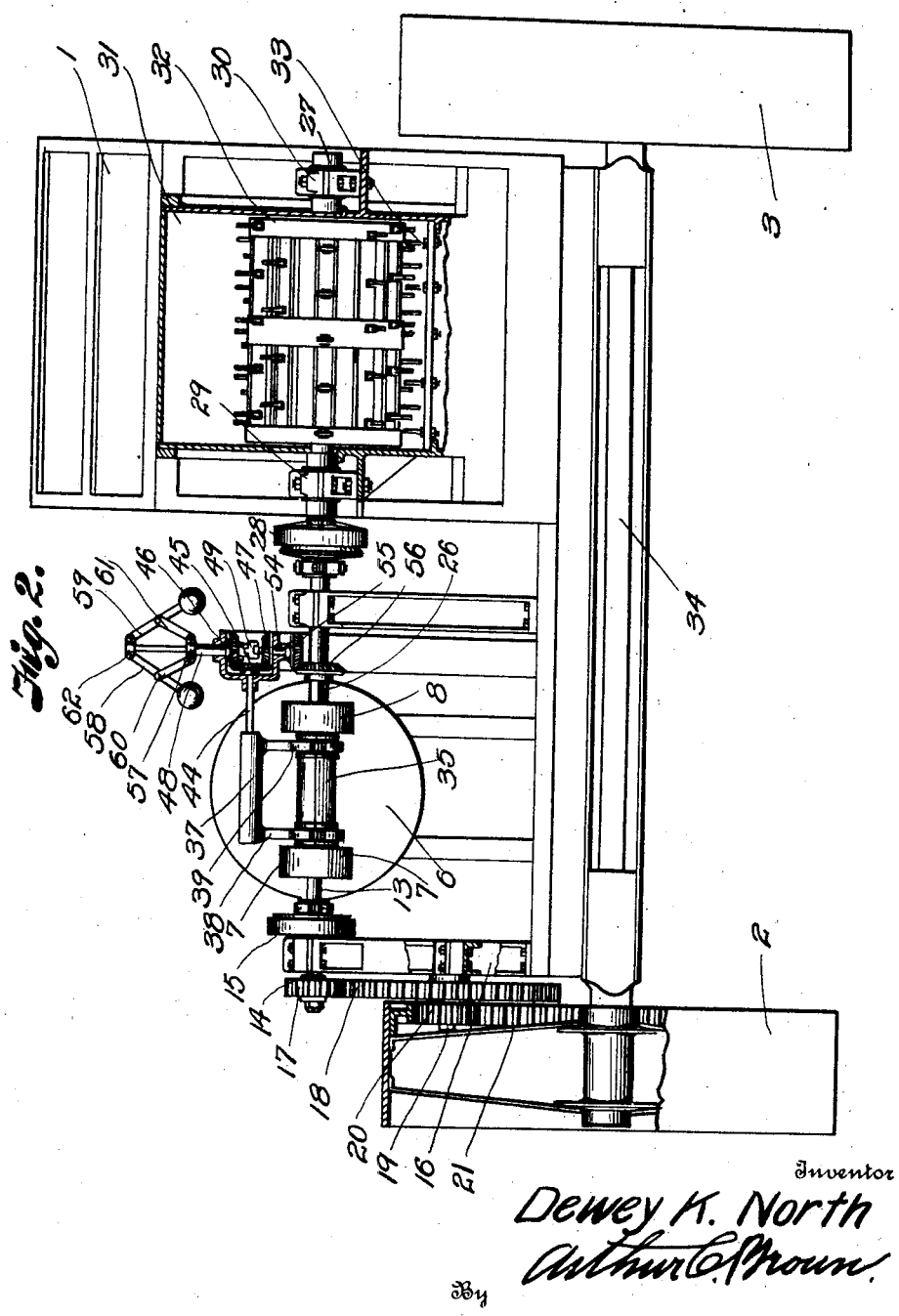

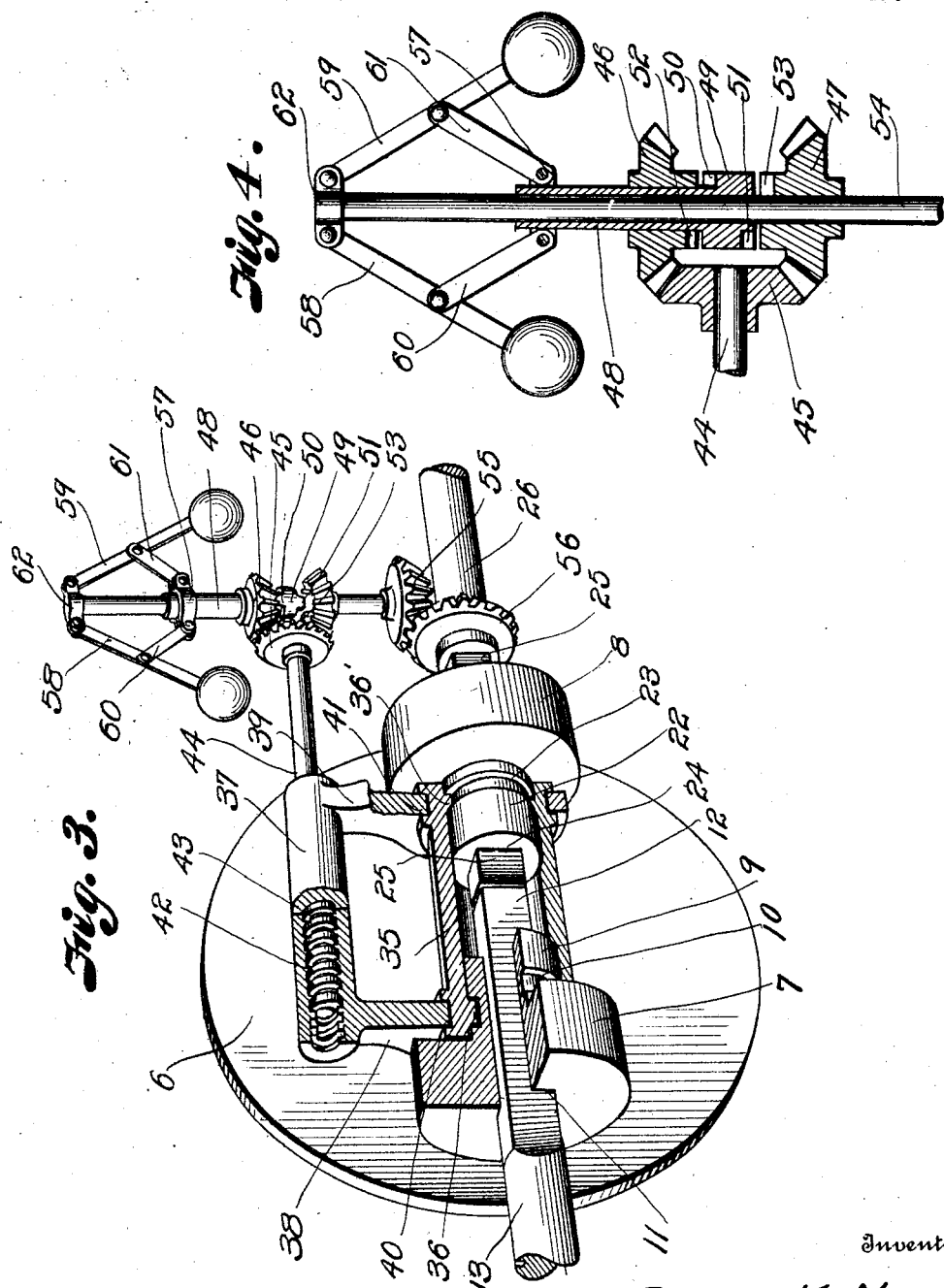

DEWEY K. NORTH, OF McCRACKEN, KANSAS.

SPEED REGULATOR FOR THRASHER CYLINDERS.

1,404,472.  Specification of Letters Patent.  Patented Jan. 24, 1922.

Application filed March 17, 1921. Serial No. 453,054.

*To all whom it may concern:*

Be it known that I, DEWEY K. NORTH, a citizen of the United States, residing at McCracken, in the county of Rush and State of Kansas, have invented certain new and useful Improvements in Speed Regulators for Thrasher Cylinders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a speed governor for a power transmission device and the invention is particularly applicable for use in connection with thrashing machines in which there is a mechanical coupling between the thrashing machine cylinder and the traction wheels of the thrashing machine.

As an example of the application of my invention I have shown it applied to a combined harvester and thrasher, the governing mechanism constituting part of the mechanical coupling between the power transmission for the tractor wheel of the thrashing machine and harvester and the thrasher cylinder.

In order to efficiently separate the grain from the heads, the thrasher cylinder should revolve at a speed proportionate to the amount of straw fed into the hopper; for example, if the grain in the field is thick and heavy so that there is a heavy yield per acre and the thrasher cylinder is driven at a speed to best take care of the straw fed to it, the efficiency of the cylinder will drop when the yield is less, that is, when the machine is passing over a thin field of grain and the proportionate amount of straw is relatively slight. If the speed of the cylinder is as fast in receiving the grain from the thinly covered ground as it is for the thickly covered ground, the heads will pass too fast through the cylinder and concave so that all of the grain will not be separated.

If, on the other hand, the speed of the cylinder is slow enough to beat out the grain from the thinly covered ground, the cylinder and concave will be choked when the machine passes over a thickly covered area.

Furthermore, the cylinder and concave is designed to pass a certain amount of straw through it per minute and the cylinder should be driven at a speed requisite to do that. In thinly covered fields the machine must be speeded up in order to feed a requisite quantity of straw to the hopper or cylinder and concave. In those machines in which the cylinder is driven at a ratio of one-to-one with respect to the driving wheel of the machine, when the machine is speeded up, the cylinder rotates too fast and when the machine is slowed down, the cylinder operates too slow.

It is the purpose of my invention to provide a governor means in which the speed of the cylinder will be maintained substantially constant irrespective of variations in speed of the machine or tractor wheel therefor, and the contemplated mechanism provides means whereby the cylinder can be driven at a proportionate speed in inverse ratio to the speed of the tractor wheel. That is, when the machine is moving faster than normal, the cylinder will be rotating inversely slower than the driving wheel of the machine but at approximately normal speed, the mechanism being constructed in such a manner, however, that there may be a one-to-one driving connection between the traction wheel and the cylinder under normal conditions.

In the drawings,

Fig. 1 is a side elevational view of a combined harvester and thrasher of conventional design to which my invention is applied.

Fig. 2 is a view partly in end elevation and partly in section of the mechanism shown in Fig. 1.

Fig. 3 is a detail, perspective view, partly in section, of the governing mechanism and part of the transmission, and Fig. 4 is a longitudinal, sectional view through the governor.

The combined harvester and thrasher 1 is supported on front wheels 2 and 3 and the rear wheels 4. The machine is of the tractor type in that it is driven from a self-contained power plant, illustrated as a hydrocarbon engine 5, on the crank shaft of which is a friction disk 6 adapted to contact with the driven friction pinions 7 and 8. The pinion 7 is provided with an inwardly projecting collar or hub 9 having a circumferential groove 10 therein, the bore of the hub or collar being polygonal in cross section, as indicated at 11, to receive the polygonal end 12 of the drive shaft 13, which drives the stub shaft 14 through a friction clutch 15. The drive shaft 14 is carried by a pillow block or standard 16 and it drives a pinion 17, meshing with the externally toothed gear 18 on a shaft 19 carried by the pillow block or standard 16. The shaft 19 carries a pinion 20, which meshes with the internally toothed rack 21 of the wheel 2.

The pinion 8 has an inwardly projecting hub or collar 22, provided with a circumferential groove 23, the bore of the hub being polygonal in cross section, as indicated at 24 to receive the polygonal end 25 of the driven shaft 26, which drives the cylinder shaft 27 through a sleeve clutch 28, corresponding to the sleeve clutch 15.

The cylinder shaft is mounted in bearings 29 and 30 on opposite sides of a hopper 31, in which is a cylinder 32 and concave 33 of approved construction. Therefore, when the shaft 26 is being driven, the cylinder 32 will be driven and when the shaft 13 is being driven, the wheel 2 will be driven to propel the vehicle over the ground, the wheels 2 and 3 being driven together through the medium of the connecting axle 34 (see Fig. 2).

By reference to Fig. 3 it will be observed that the shafts 13 and 26 are aligning shafts and that the hubs 9 and 22 for the pinions 7 and 8 are connected by a shifting sleeve 35, which has inwardly projecting ribs or collars 36 and 36′ to engage in the grooves 10 and 23 respectively. The sleeve 35 is connected to an internally threaded shifter sleeve 37 by yokes 38 and 39, which engage the grooves 40 and 41 in the exterior of the sleeve 35.

The internal threads 42 of the sleeve 37 are engaged by the external threads 43 on the shifter rod 44, having at one end a beveled gear 45 in constant mesh with upper and lower beveled gears 46 and 47. The gear 46 is mounted on a governor sleeve 48, having at one end a clutch head 49, provided with sets 50 and 51 of clutch teeth, which are adapted to alternately engage with the clutch teeth 52 in the beveled gear 46 and the clutch teeth 53 in the beveled gear 47. The sleeve and gears are mounted on the governor spindle 54, which carries at its lower end the beveled gear 55 to mesh with the gear 56 on the shaft 26, as clearly seen in Figs. 2 and 3.

The sleeve 48 is provided with a collar 57 having link connections with the governor ball levers 58 and 59, through the medium of the links 60 and 61, the levers 58 and 59 being connected to the spindle 54 by the collar 62, after the manner of an ordinary speed governor.

When the parts are assembled and the machine is moving at a normal speed, the friction pinions 7 and 8 will be equal distances radially away from the center of the friction disk 6 so that both the wheels 2 and 3 and the cylinder will be driven at the same speed. This will be the normal condition; that is, when the machine is passing through a field of normal grain.

If the machine enters a zone where the grain is thin or the stalks far apart due to unfertile ground or poor growth from any cause, it will be necessary to speed up the machine. Then the disk 6 is driven at a relatively high speed and the speed from 26 will rotate the governor spindle 54 so as to cause the arms 58 and 59 to swing out after the manner of an ordinary ball governor, thereby throwing the clutch teeth 50 into engagement with the teeth 52 and turning the shifter rod 44 so that its spiral portion or worm will turn in the spirally grooved portion 42 of the sleeve 37 and move the sleeve 37 from right to left, shifting the pinions 7 and 8 from right to left so that there will be a greater peripheral speed of the disk 6 for the pinion 7 than there will be for the pinion 8. Therefore, the pinion 7 will be rotated at a relatively high speed and the speed of the pinion 8 will be inversely changed.

It is contemplated that the actual speed of the pinion 7 will remain substantially constant but its relative speed with respect to the wheels 2 and 3 will be diminished. Therefore, if the grain is fed into the hopper 31 at a universal rate of speed, the cylinder will work at its greatest efficiency.

If the machine encounters thickly covered ground so that a given quantity of grain will be harvested at a sufficient rate to supply the cylinder and concave faster than the cylinder is normally rated for, then the machine will be slowed up, the governor balls will drop and the clutch teeth 51 will engage the teeth 53 and the shaft 54 will be reversed, moving the shifter sleeve from left to right so that the pinion 8 will be driven from a greater peripheral speed from the disk 6 than the pinion 7. Consequently, there will be an increased speed for the cylinder over the tractor wheel.

Any ratio between the two extremes may be controlled through the governor, it being apparent then, that the speed of the cylinder will be substantially constant irrespective of variations in speed of the tractor and that by this means, the most efficient result can be obtained.

What I claim and desire to secure by Letters Patent is:

1. The combination with a tractor wheel of a harvesting thrasher and the cylinder thereof, of a power-actuated member on the thrasher, separate, driven shafts for the tractor wheel and the cylinder respectively, driving connections between the power-actuated member and the separate shafts, and speed responsive means for varying the speed ratio between the wheel and the cylinder.

2. The combination with a tractor wheel of a harvesting thrasher and the cylinder thereof, of a power driven friction disk on the thrasher, a friction pinion for rotating the cylinder, a friction pinion for driving the tractor wheel, the pinions being in driving contact with the rotatable friction disk, and means for simultaneously varying the relative radial distances of the pinions with respect to the rotating disk to vary the speed ratio between the two pinions to vary the speed ratio between the tractor wheel and the cylinder.

3. The combination with a tractor wheel of a harvesting thrasher and the cylinder thereof, of a power driven friction disk on the thrasher, a friction pinion for rotating the cylinder, a friction pinion for driving the tractor wheel, the pinions being in driving contact with the rotatable friction disk, and speed responsive means for simultaneously varying the relative radial distances of the pinions with respect to the rotating disk to vary the speed ratio between the two pinions to vary the speed ratio between the tractor wheel and the cylinder.

4. The combination with a tractor wheel of a harvesting thrasher and the cylinder thereof, of a power driven friction disk on a thrasher, a friction pinion for rotating the cylinder, a friction pinion for driving the tractor wheel, the pinions being in driving contact with the rotatable friction disk, and means for simultaneously varying the relative radial distances of the pinions with respect to the rotating disk to vary the speed ratio between the two pinions to vary the speed ratio between the tractor wheel and the cylinder, said means comprising a connector between the two pinions, a speed-responsive device driven in response to movement of one of the pinions, and a speed-responsive-device-actuated shifter, operatively connected to the connector.

5. In combination, the tractor wheel of a harvesting thrasher and the cylinder thereof, a power driven friction disk on the thrasher, a friction pinion engaging the disk and driven from the tractor wheel, a friction pinion receiving motion from the disk and connected to the cylinder, and a speed responsive device operated in response to movement of the cylinder and having mechanical connections with the pinions to move them across the disk to change their relative speeds so that the speed of the cylinder will remain constant irrespective of variations in the speed of the tractor wheel.

In testimony whereof I affix my signature.

DEWEY K. NORTH.